United States Patent [19]

Nagaishi et al.

[11] Patent Number: 4,951,209
[45] Date of Patent: Aug. 21, 1990

[54] INDUCTION VOLUME SENSING ARRANGEMENT FOR INTERNAL COMBUSTION ENGINE OR THE LIKE

[75] Inventors: Hatsuo Nagaishi, Zushi; Hiroshi Sanbuichi, Yokohama; Masaaki Uchida, Yokohama; Hiromichi Miwa, Yokohama; Toshio Takahata, Yokohama; Yasuo Seimiya, Fujisawa; Hiromasa Kubo, Yokohama, all of Japan

[*] Notice: The portion of the term of this patent subsequent to Oct. 10, 20006, has been disclaimed.

[73] Assignee: Nissan Motor Co., Ltd., Yokohama, Japan

[21] Appl. No.: 69,038

[22] Filed: Jul. 1, 1987

[30] Foreign Application Priority Data

| Jul. 2, 1986 [JP] | Japan | 61-155636 |
| Jul. 24, 1986 [JP] | Japan | 61-174675 |
| Jul. 25, 1986 [JP] | Japan | 61-174996 |
| Jul. 25, 1986 [JP] | Japan | 61-174993 |

[51] Int. Cl.$^5$ .................................. F02M 17/00
[52] U.S. Cl. .................. 364/431.04; 364/431.03; 123/492; 123/494; 73/118.2
[58] Field of Search ............ 364/431.03, 431.04, 364/431.05, 431.07, 431.08, 431.12; 123/306, 486, 489, 492, 494; 73/117.3, 118.2, 119 A

[56] References Cited

U.S. PATENT DOCUMENTS

| 4,530,333 | 7/1985 | Nishimura | 123/486 |
| 4,594,667 | 6/1986 | Yasuhara | 364/431.04 X |
| 4,594,987 | 6/1986 | Wataya et al. | 123/494 |
| 4,737,914 | 4/1988 | Abe et al. | 364/431.05 X |

FOREIGN PATENT DOCUMENTS 0142856 11/1984 European Pat. Off.
3438429 10/1984 Fed. Rep. of Germany.

OTHER PUBLICATIONS

MTZ, "Mono-Jetronic-A Precise Fuel-Injection System . . . Self-Adaption", vol. 47, May 1986, p. 179.

*Primary Examiner*—Eugene R. LaRoche
*Assistant Examiner*—Seung Ham
*Attorney, Agent, or Firm*—Foley & Lardner, Schwartz, Jeffery, Schwaab, Mack, Blumenthal & Evans

[57] ABSTRACT

The throttle valve position is sensed and the effective cross sectional area of the induction passage determined via table look up. The value thus derived is divided by the engine speed. A basic air induction quantity is then determined via table look up and subsequently modified using a correction coefficient to allow for the effect of engine speed on the amount of air inducted into each cylinder. The effect of injector position (viz., MPI/SPI) is taken into consideration and values suited for both generated in given embodiments. In the event that the maximum induction vacuum is limited by a BCD valve or the like, an embodiment anticipates the change in induction characteristics based on the engine speed.

20 Claims, 16 Drawing Sheets

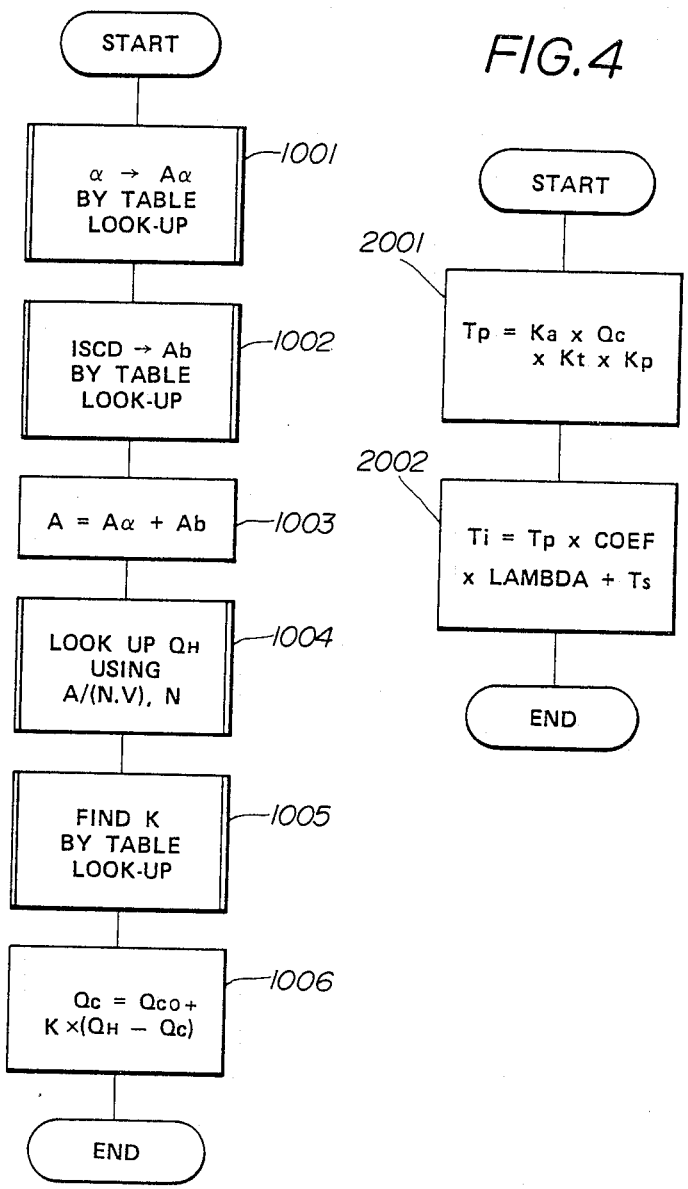

INDUCTION VOLUME SENSING ARRANGEMENT FOR INTERNAL COMBUSTION ENGINE OR THE LIKE

BACKGROUND OF THE INVENTION

1. Field of the Invention

The present invention relates generally to an internal combustion engine and more specifically to an induction sensor arrangement for a fuel injected engine or the like which enables an accurate determination of the amount of air inducted thereinto and which obviates the sharp overly rich/lean deviations in the air-fuel ratio which tend to be produced during transitory modes of engine operation.

2. Description of the Prior Art

In order to optimally control fuel injected engines it is vital to accurately sense the amount of air being inducted into the engine. To achieve this it is well known to directly sense the amount of air being inducted using hotwire/vortex and flap type air flow sensors.

However, these sensors tend to be overly responsive to the to the pressure pulsations which occur in the induction system. Accordingly, the accuracy thereof is apt to vary widely depending on the mode of the operation of the engine. This induces the drawback that as the amount of fuel supplied to the engine is determined using the sensed induction volume rich/lean spikes in the air-fuel control characteristics occur. This causes the torque generated by the engine tends to undesirably fluctuate with the accuracy of the induction system. Moreover, the above mentioned devices are both bulky and expensive and thus add to the cost of the vehicle as well as consuming a relatively large amount of the limited space available in the engine compartment.

As an alternative to the above mentioned direct sensing technique it is also known to indirectly sense or derive the amount of air being inducted by sensing a number of engine operation parameters which vary with the amount of air being inducted and using the data to predict the same on the basis of pre-recorded data. For example, it is known to sense the engine speed, induction pressure and throttle position and utilize this data to obtain an induction air amount by way of a table look-up technique. However, this method encounters the problem that the compilation of the data tables (which are recorded in the form of a four parameter system and which can be depicted in the form of a three dimensional contour map) requires large amounts of expensive memory space. Moreover, these systems have not proven sufficiently effective during transitory modes of engine and vehicle operation.

SUMMARY OF THE INVENTION

An object of the present invention is to enable accurate control of the fuel supplied to the engine particularly during transitory modes of operation and without the need of expensive sensor arrangements which directly sense the amount of air being inducted into the engine.

In brief, the above object is achieved by an arrangement wherein the throttle valve position is sensed and the effective cross sectional area of the induction passage determined via table look up. The value thus derived is divided by the engine speed. A basic air induction quantity is then determined via table look up and subsequently modified using a correction coefficient to allow for the effect of engine speed on the amount of air inducted into each cylinder The effect of injector position (viz., MPI/SPI) is taken into consideration and values suited for both generated in given embodiments. In the event that the maximum induction vacuum is limited by a BCD valve or the like, an embodiment anticipates the change in induction charateristics based on the engine speed.

More specifically, the present invention is deemed to take the form of a method of operating an internal combustion engine which features the steps of: sensing a first engine operational parameter which varies with the load on the engine; sensing a second engine operational parameter which varies with the rotational speed of the engine; deriving a first variable by comparing the value of the first engine operational parameter with a first set of recorded data; modifying the first variable using the value of the second engine operational parameter to derive a second variable; and comparing the value of the second variable with a second set of recorded data to obtain a third variable indicative of the amount of air being inducted into the engine which third variable can be used to implement engine air-fuel control.

BRIEF DESCRIPTION OF THE DRAWINGS

FIGS. 3 and 4 are flow charts showing the steps which characterize the derivation of the air induction and fuel injection quantity according to the first embodiment;

DETAILED DESCRIPTION OF THE PREFERRED EMBODIMENTS

First Embodiment

Figure 1:
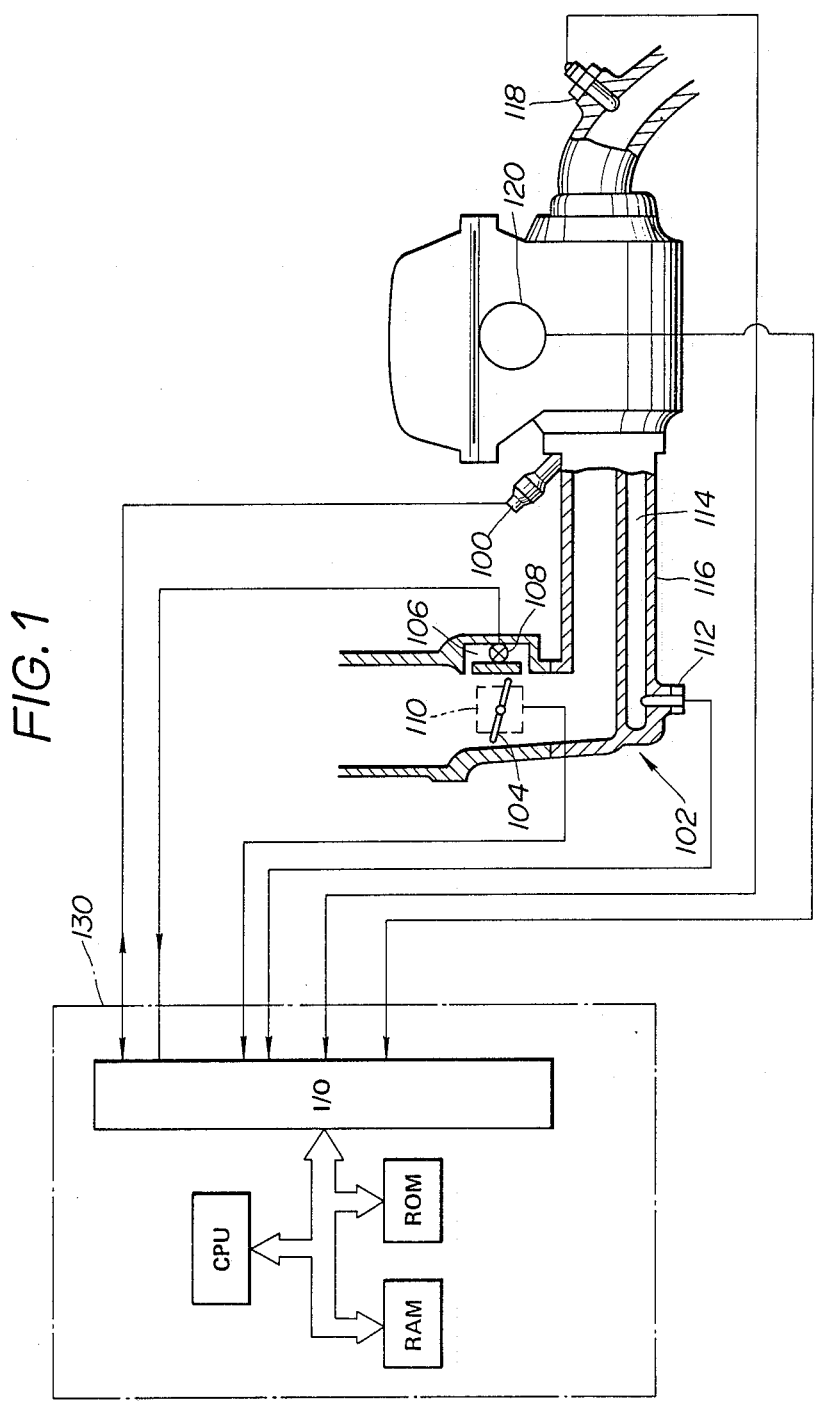
FIG. 1 shows an engine system to which the first embodiment of the present invention is applied.

FIG. 1 shows in partial cross section an internal combustion engine to which a first embodiment of the present invention is applied. In this arrangement a plurality of so called multiple point type fuel injectors 100 (only one is shown) are disposed near the downstream end of an induction manifold 102. A throttle valve 104, a by-pass passage 106 which leads around the throttle valve 104 and an idle control valve 108 disposed in the by-pass passage 106 are arranged at the upstream end of the manifold 102 in a manner essentially as shown. A position sensor 110 is operatively connected with the throttle valve 104 for sensing the opening degree of the same.

The illustrated arrangement further includes a temperature sensor 112 arranged to sense the temperature of the engine coolant which is circulated through a heating jacket arrangement 114 disposed along the lower surface of the runners 116 which lead from a riser of the manifold 102 to each of the induction ports of the engine.

An air-fuel ratio sensor 118 (e.g. $O_2$ sensor or the like device) is disposed in the exhaust system for sensing the content of the exhaust discharged from the combustion chamber of the engine and generating a signal indicative thereof.

Operatively connected with the crankshaft of the engine or ignition system is an engine rotational speed sensor 120.

A control unit 130 which in this embodiment includes a microprocessor, is arranged to receive inputs from the above mentioned sensors via an I/0 interface. The ROM of the microprocessor contains various programs and pre-determined data. These programs are, as will be made clear hereinlater, arranged to process the information provided by the sensors and selectively induces the output of various command signals to the fuel injectors and a servo (not shown) which operates the idle control valve 108. The just mentioned servo is arranged to generate a feedback signal which are inputted to the control unit via the I/0 interface.

Figure 2:
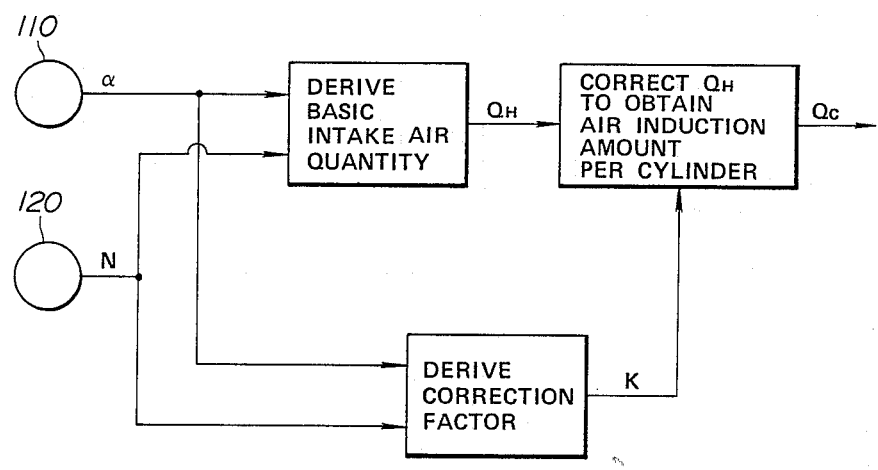
FIG. 2 shows in schematic form the concept which underlies the first embodiment of the present invention.

The characteristic arrangement of the first embodiment of the present invention is shown in FIG. 2. This embodiment involves the indirect derivation of the amount of air being inducted in the engine using the throttle valve position and engine speed parameters.

In brief, a value alpha representative of the throttle valve opening is used to derive a value A representative of the effective cross-section of the induction passage. This value is then divided by the engine speed N to derive a value A/N. This A/N value is subsequently used in combination with the engine speed N to derive a value QH indicative of the amount of air being inducted, via table look-up.

In the event that the induction system is provided with a by-pass passage (i.e. #106) which leads around the throttle valve 104 for the purposes of idling control, the opening degree of the valve (108) which controls the same is sensed and a signal Beta indicative of the opening degree generated. This value is used in combination with the value of alpha for deriving the value of A. The QH value is then modified using a correction factor K in a manner to develop a value QC indicative of the amount of air being inducted into each cylinder.

FIG. 3 shows in flow chart form an example of a program used in the first embodiment to execute the above mentioned calculations.

Figure 5:
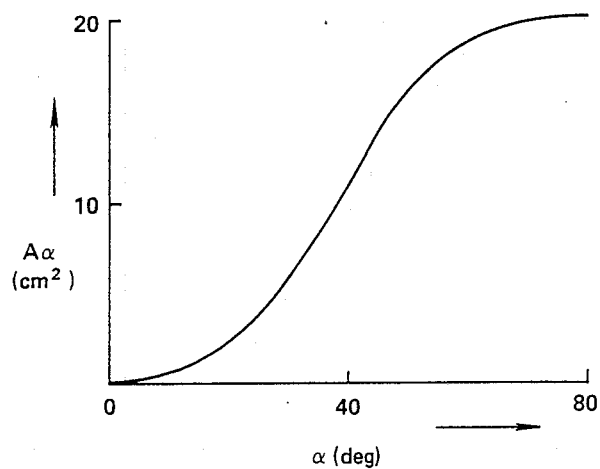
FIG. 5 is graphical illustration of a first table which is recorded in memory in terms of throttle valve opening degree and the effective cross section through which air may flow available for the given throttle opening.
Figure 6:
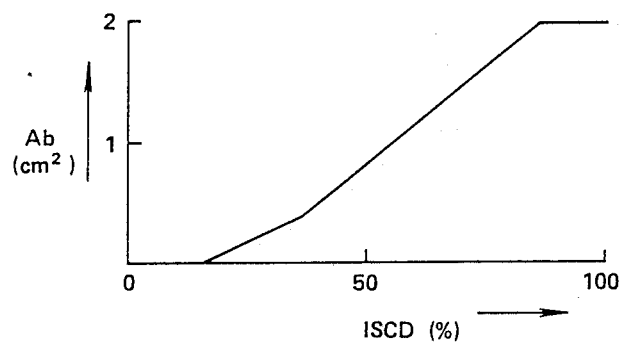
FIG. 6 is a graphical illustration of a second table which is recorded in memory in terms of idle valve opening degree (ISCD %) and the corresponding effective cross-section of a by-pass passage which leads around the main or primary throttle valve.

As shown, the first step 1001 of this program is such as to sample the input from the throttle position sensor 110 and derive a signal Aalpha indicative of the effective cross-section of the induction passage with the throttle valve 104 in its instant position. In this embodiment this derivation is performed by table look-up using a table of the nature depicted in FIG. 5. This table is recorded in terms of two parameters only and therefore requires relatively little memory space. Following this, in step 1002 the ISCD feedback signal Beta from the idle control valve servo is sampled and a value Ab derived using a table look-up technique. In this embodiment a table of the nature depicted in FIG. 6 is used for this purpose.

At step 1003 the values Aalpha and Ab are summed to determine the total cross-section available for air to flow toward the cylinders of the engine.

Figure 7:
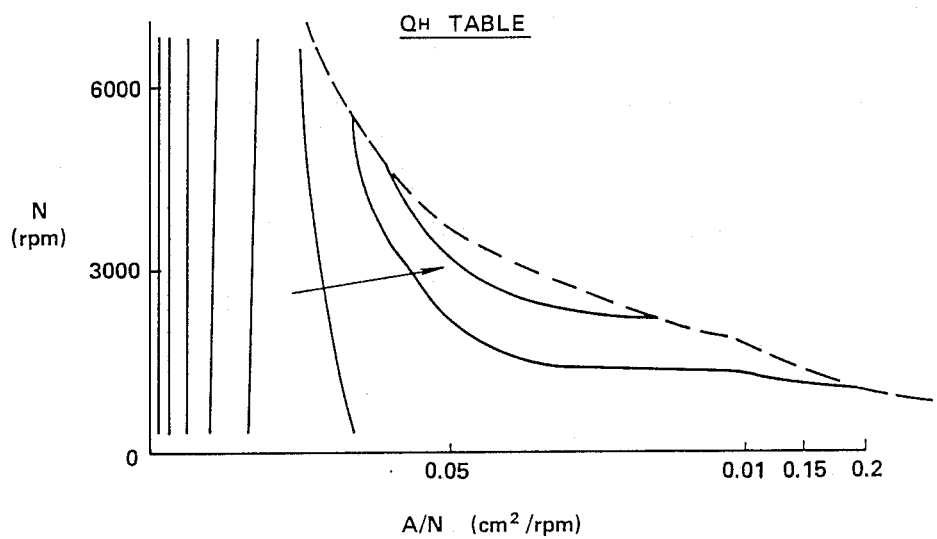
FIG. 7 is a graphical representation of a third table which is recorded in memory in terms of engine speed, the ratio of the effective cross sectional area of the induction passage to the engine speed, and a value QH indicative of the amount of air being inducted.

Following the derivation of A, the value of A/N where N represents the instant engine speed as determined by sampling the output of the engine speed sensor 120, is obtained. This value and the corresponding value of N are used to to perform a table look-up using a table of the nature illustrated in FIG. 7. This table is recorded in terms of three parameters. Viz., N, A/N and QH wherein QH is the basic air induction quantity.

Figure 8:
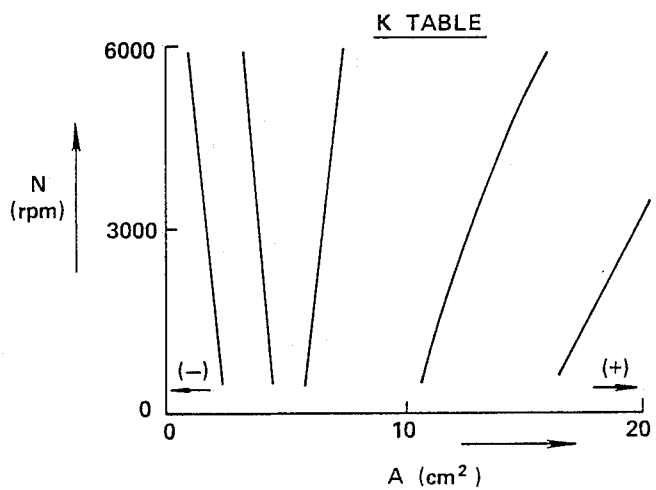
FIG. 8 graphically shows a fourth table recorded in terms of engine speed, effective cross sectional area and a correction factor K which is used to modify the value of QH derived using the table shown in FIG. 7.

At step 1005 a table look-up technique using the values of A and N is performed in order to derive the value of a correction coefficient K which compensates for the engine speed related variation in volume of air inducted into the engine cylinders. The table used in this operation is of the nature shown in FIG. 8. As will be appreciated from this figure, the cylinder charging characteristics over an engine speed range of 0 to 6000 RPM vary quite notably depending on the degree to which the throttle valve is opened. e.g. until the throttle valve 104 is opened beyond a given amount the amount of air introduced into the cylinders per cycle actually reduces with an increase in engine speed.

At step 1006 the value of the coefficient K derived in the previous step is used to obtain a corrected air induction value (Qc) using the following equation:

$$Qc = QCo + K(QH - Qco) \qquad (1)$$

wherein:

QCo is the value of QH derived on the previous run of the instant program (under steady state engine operation QCo=QH).

FIG. 4 shows in flow chart form the steps which characterize the calculation of the amount of fuel to be injected via the MPI system. In this embodiment the following equation is used.

$$Tp = Ka \times Qc \times Kt \times KP \tag{2}$$

wherein:
Tp denotes the basic fuel injection quantity;
Ka is a constant;
Kt is an air temperature correction coefficient; and
Kp is an air pressure correction coefficient.

At step 2002 the actual amount of fuel (Ti) to injected the instant cycle of the engine is determined as follows:

$$Ti = Tp \times COEFF \times LAMBDA + Ts \tag{3}$$

wherein:
COEFF denotes a correction factor which is intended to compensate for a plurality of coefficients which effect the time required for the fuel to reach the combustion chamber. This factor includes the effects caused by wetting of the induction passage walls, the influence of the engine temperature, the rate of evaporation of the fuel, engine start up, idling etc.;
LAMBDA is a feed-back correction coefficient which is variable with the output of the air-fuel ratio sensor disposed in the exhaust system of the engine; and
Ts is a correction factor which allows for the rise time of the fuel injector and which is added to the pulse width in order to compensate for the reduction in actual injection which will otherwise occur.

Figure 9:
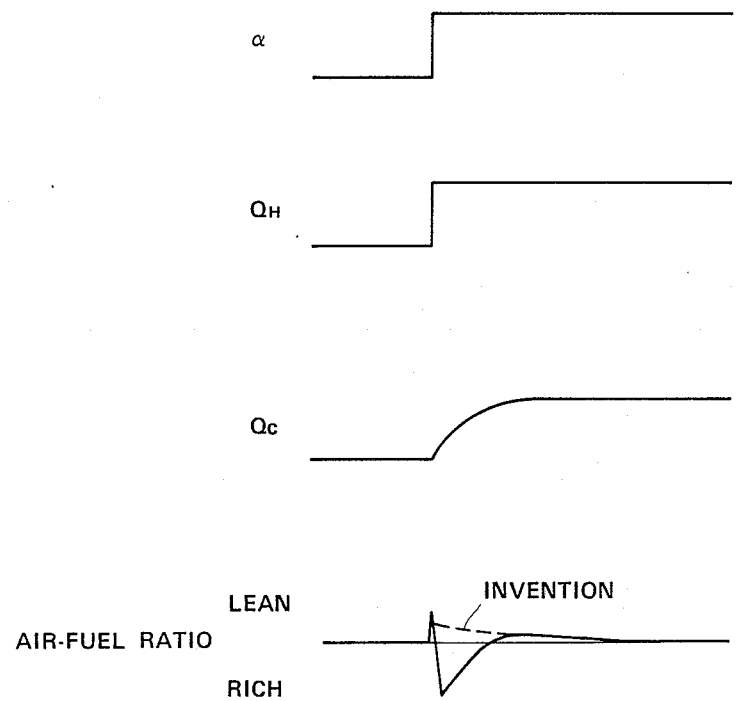
FIG. 9 is a timing chart showing the air-fuel ratio control obtained using the value of Qc derived with the first embodiment.

With the first embodiment a notable improvement in air-fuel ratio control is possible as will be apparent from FIG. 9. In this figure upon a demand for acceleration, for example as indicated by a sudden opening of the throttle valve (see trace alpha), the value of QH (basic induction vol.) increases correspondingly. Via the modification using the correction factor K it is possible to more accurately predict the actual amount of air being supplied into each of the cylinders under the instant mode of operation and thus derive the value Qc which varies as shown. The resulting air-fuel control is shown in broken line in the lowermost trace. As will be appreciated, with the first embodiment of the present invention the sudden lean spike and subsequent large enriching of the air-fuel mixture which tends to be induced using the prior art sensing techniques is avoided and a close to liner control characteristic is obtained.

Second Embodiment

Figure 10:
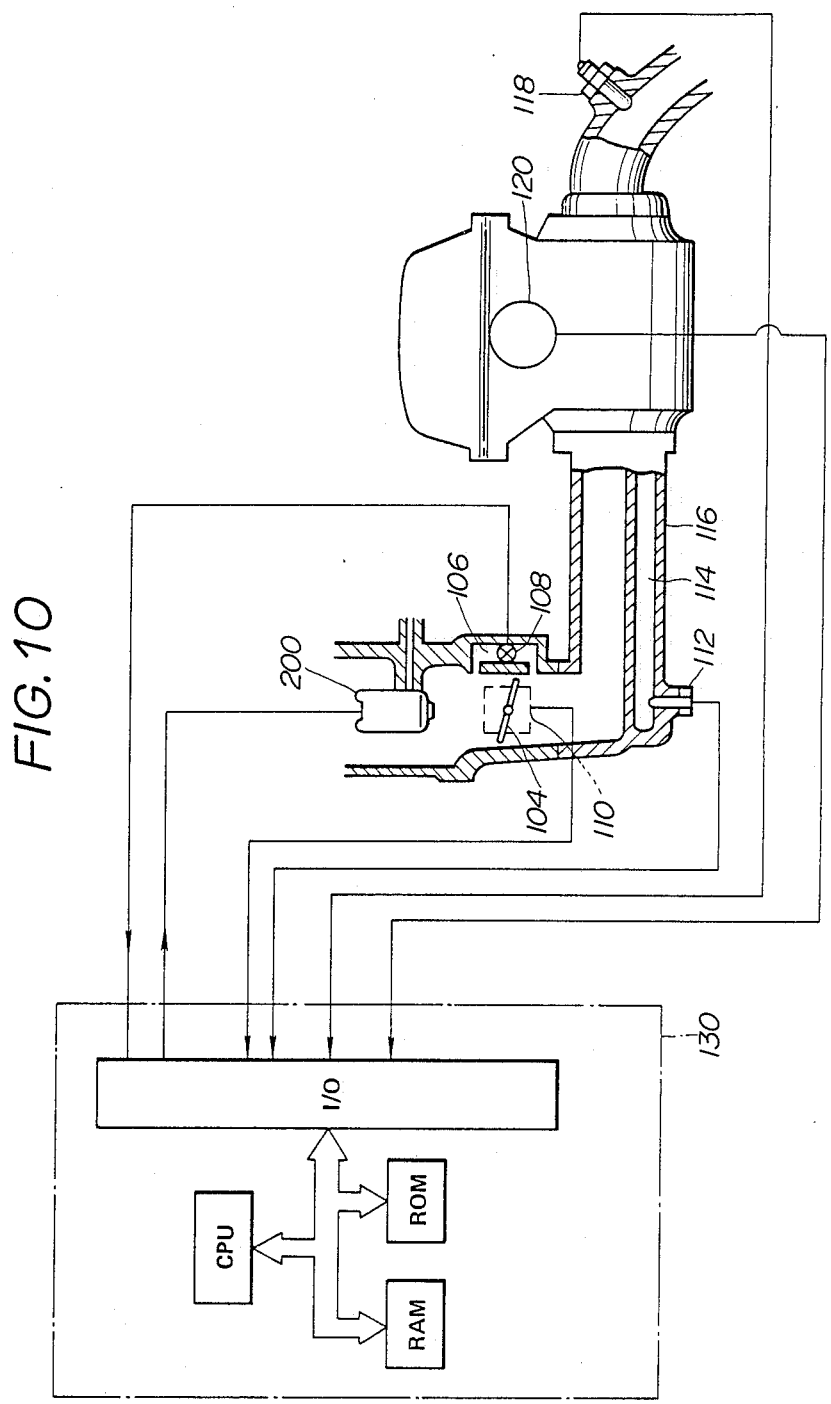
FIG. 10 is a partially sectioned elevation of an engine system to which a second embodiment of the present invention is applied.
Figure 11:
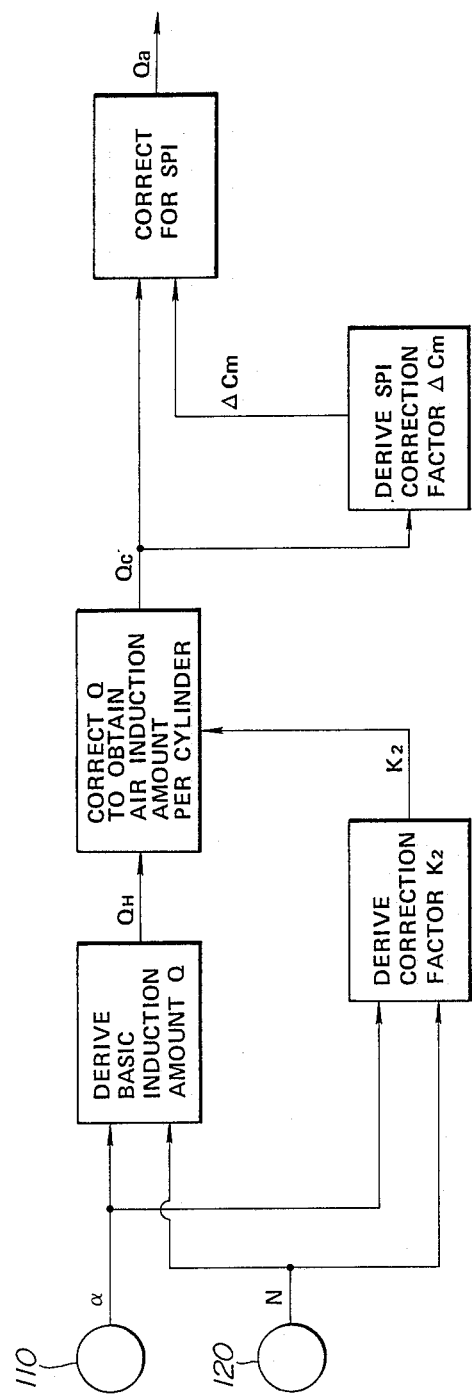
FIG. 11 is a block diagram showning the conceptial arrangement which characterizes the second embodiment of the present invention.

FIG. 10 shows an engine system to which a second embodiment of the present invention is applied. This system differs basically in that the MPI system is replaced with a SPI (single point injection) system. Accordingly, as will be clear from the block diagram of FIG. 11 the values of QH and Qc are obtained in essentially the same manner as in the first embodiment however further correction is effected to allow for the distance between the SPI injector 200 and the induction ports of the respective engine cylinders.

Figure 12:
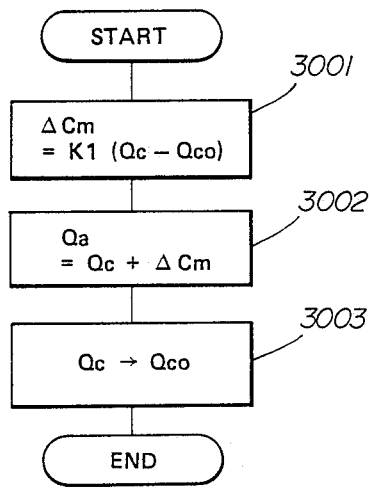
FIGS. 12 and 13 are flow charts depicting the steps excuted during the calculation of an induction air amount which is modified for use in SPI injection systems according to a second embodiment of the present invention.

In this embodiment the values of QH and Qc are derived essentially in the same manner as in the first embodiment and thus the redundant presentation of a flow cart depicting the same is omitted for brevity. In step 3001 of FIG. 12 deltaCM is derived using the following equation:

$$DeltaCm = Kl(Qc - Qco) \tag{4}$$

wherein:
DeltaCm is a value representative of the amount of air which must be added to the basic quantity in order to compensate for the distance between the SPI injector and the cylinders;
Kl is a constant which is determined for each type of induction manifold/system and Qco and Qc are the values utilized in step 1006 of the flow chart shown in FIG. 4.

In step 3002 the calculation of a value Qa is carried out and in step 3003 the instant value of Qc is set in RAM as Qco in preparation of the next run of program described in connection with steps 1001 to 1006 of FIG. 3, and the instant run of this program finishes.

Figure 13:
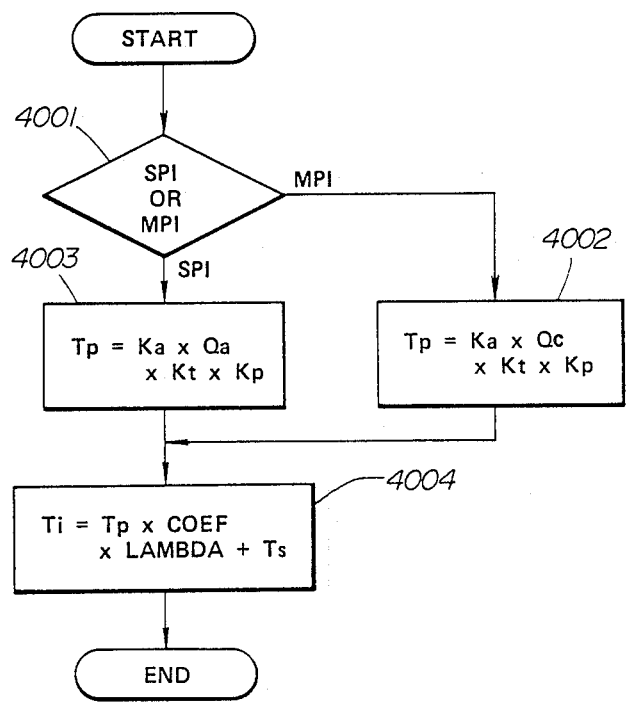

FIG. 13 shows a program which is provided to enable the instant embodiment to used in conjunction with either MPI or SPI injection systems. As shown the first step 4001 of this program is such as to determine which of the two systems is employed in the engine under control.

In the event that the system is equipped with MPI then the program flows to step 4002 wherein the following equation is executed:

$$Tp = Ka \times Qc \times Kt \times KP \tag{5}$$

wherein:
Tp denotes the basic fuel injection quantity;
Ka is a constant;
Kt is an air temperature correction coefficient; and
Kp is an air pressure correction coefficient.

On the other hand, if SPI is used then the program flows to step 4002 wherein equation (4) is executed:

$$Tp = Ka \times Qa \times Kt \times Kp \tag{6}$$

It will be noted that the values other than Qc are as set forth above.

At step 4004 the actual amount of fuel (Ti) to injected the instant cycle of the engine is determined using the equation:

$$Ti = Tp \times COEFF \times LAMBDA + Ts \tag{7}$$

With the above described control due to the derivation of Qa it is possible to suitably control the fuel injection in a manner that good air-fuel ratio control is effected during both acceleration and deceleration (transient) modes of operation as well as during steady state. That is to say, as will be apparent from the timing charts shown in FIG. 14, with the above technique it is possible to avoid supplying both excessive amounts or (momentary) insufficient quantites of fuel over the whole range of engine operation.

It will be noted that although the above method does not take the ignition timing of the engine into consideration that such control is not outside of the scope of the present invention and may be incorporated into the embodiments thereof without departing from the scope of the same.

Third Embodiment

Figure 15:
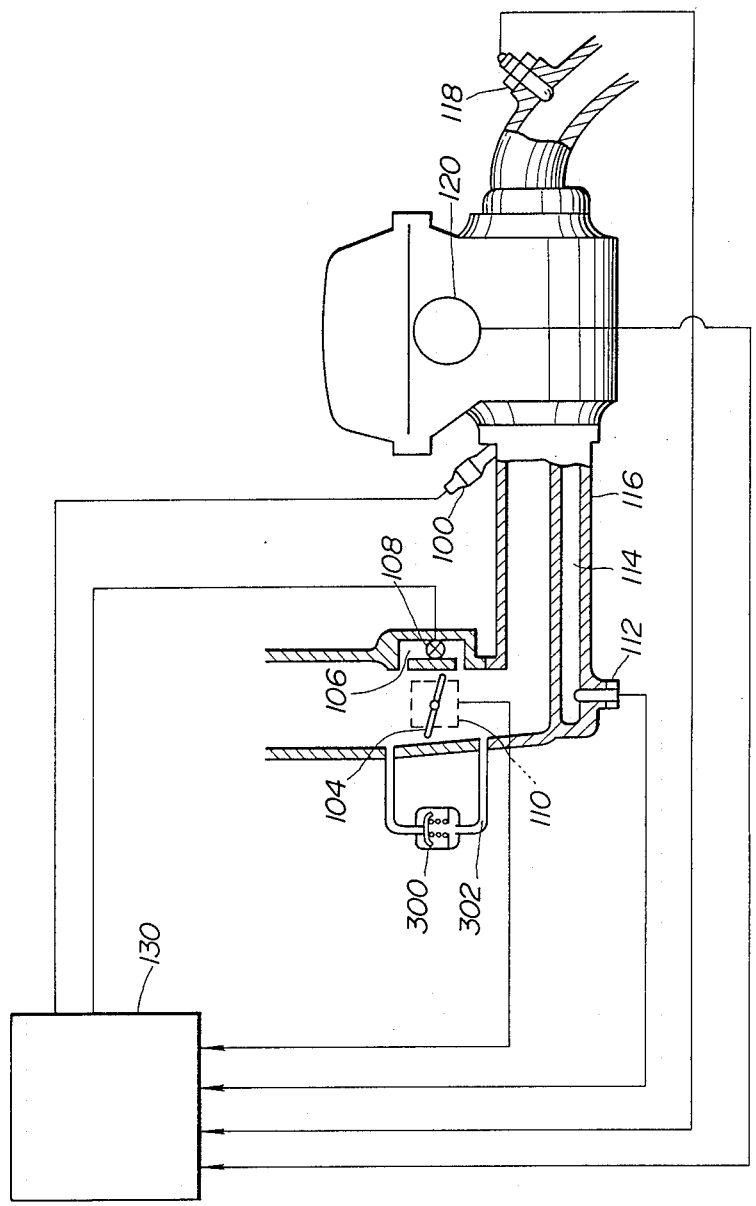
FIG. 15 is a partially sectioned elevation of an engine system to which a third embodiment of the present invention is applied.
Figure 16:
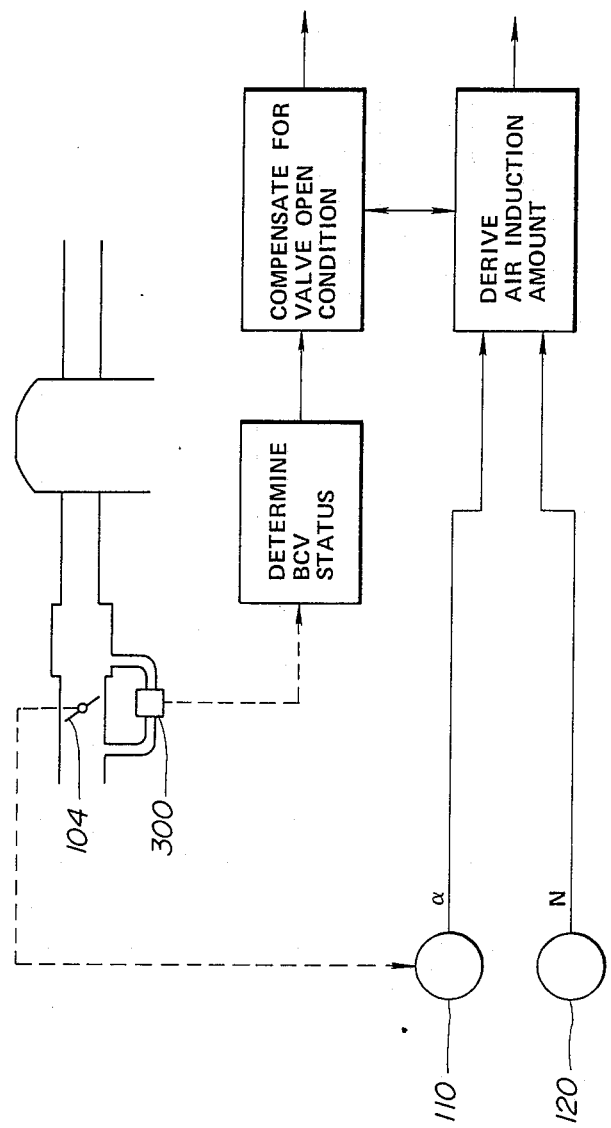
FIG. 16 is a block diagram showing the arrangement which characterizes the third embodiment of the present invention.
Figure 20:
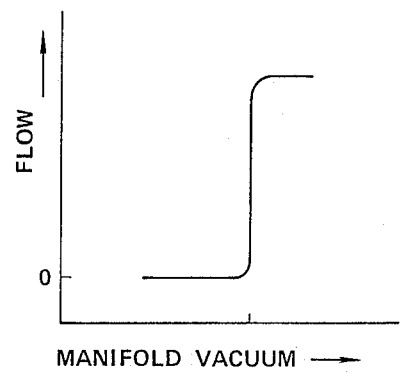
FIG. 20 is a graph showing the change in flow characteristics which occur when a boost control valve BCV opens in response to the induction vacuum exceeding a predetermined level.

FIG. 15 shows an engine system to which a third embodiment of the present invention is applied. As will be noted this system includes MPI and a boost control valve BCV 300 and conduit 302 arrangement which by-passes the throttle valve 104 in addition to the idle control passage 106. As will be appreciated this BCV 300 valve is, as shown in FIG. 20 arranged to open upon a predetermined induction manifold developing and permit a sharp but limited increase in the amount of air permitted to flow to the engine under such conditions. The purpose of this provision is to prevent excessively high induction vacuums from the developing which invite an increase in the emission levels of HC and CO. In the event that such a valve is provided it is necessary to take its effect into consideration as the position of the throttle valve position signal does not change in response to the opening and closing thereof.

Figure 17:
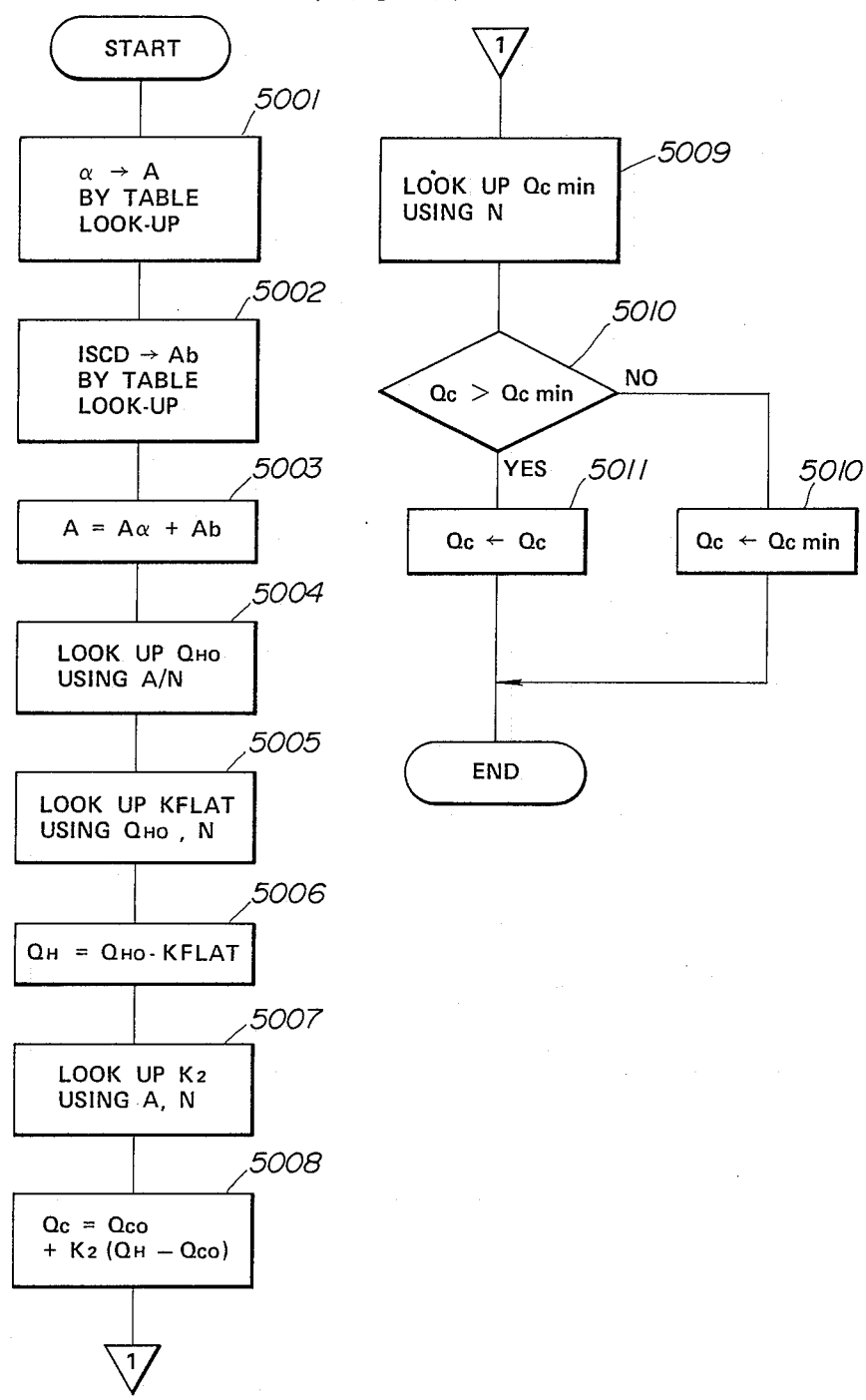
FIG. 17 is a flow chart showing the steps which characterize the operation of the second embodiment.
Figure 18:
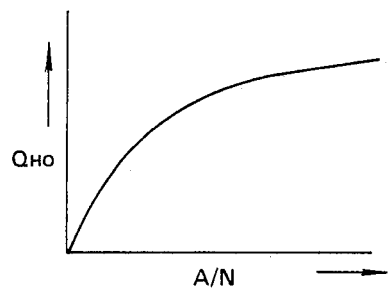
FIGS. 18 and 19 are graphical illustrations of tables which are recorded in memory for enabling the look-up of the amount of air being inducted into the engine and a correction factor utilized to futher modify the basic induction value derived using the FIG. 18 table.
Figure 19:
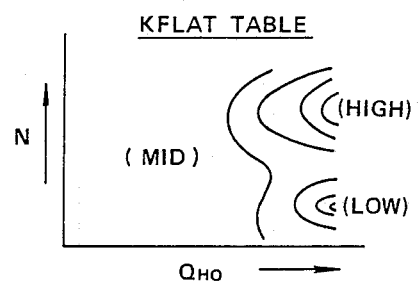

FIG. 17 shows in flow chart form the steps which characterize the instant embodiment. Steps 5001 to 5003 are essentially the same as steps 1001 to 1003 of FIG. 3. In step 5004 however, a table look up is performed in order to obtain a value QHO. It will be noted that QHO (basic induction amount) is tabled in terms of a single parameter A/N (see FIG. 18) and as such requires relatively little memory space. Following this at step 5005 a correction factor is found via look up using a table of the nature depicted in FIG. 19. At step 5007 a correction factor for modifying the value of QH derived in the previous step is obtained by table look up. This second correction factor is designed to correct the value of QH is a manner to reflect the amount of air Qc which is being inducted into each of the engine cylinders (cf step 1006 of FIG. 3).

At step 5009 a look-up is performed in order to determine for the instant engine speed how much air (Qcmin) would be permitted into the engine if the throttle valve 104 were closed. Although not shown the table used in this step is recorded in terms of air amount Qcmin and engine speed N. As will be appreciated, below a given engine speed the induction vacuum will not exceed the value at which the BCV valve 300 opens and as such will be the same as if the BCV arrangement were not in fact provided. However, above this engine speed the vacuum will tend to increase to the level where the valve will open and allow a marked increase in the (minimum) amount of air which is permitted to flow toward the engine cylinders.

At step 5010 the value of Qcmin is compared with the value of Qc derived in step 5008. If the value of Qc is less than Qcmin the value of Qcmin is set into RAM in place of the instant value of Qc; while in the event that Qc is greater then it is used. Viz., if Qc is less than Qcmin then it can be assumed that the engine throttle valve 104 is closed and that depending on the engine speed the amount of air entering the engine will be dependant on the status of the BCV.

[Fourth Embodiment]

Figure 21:
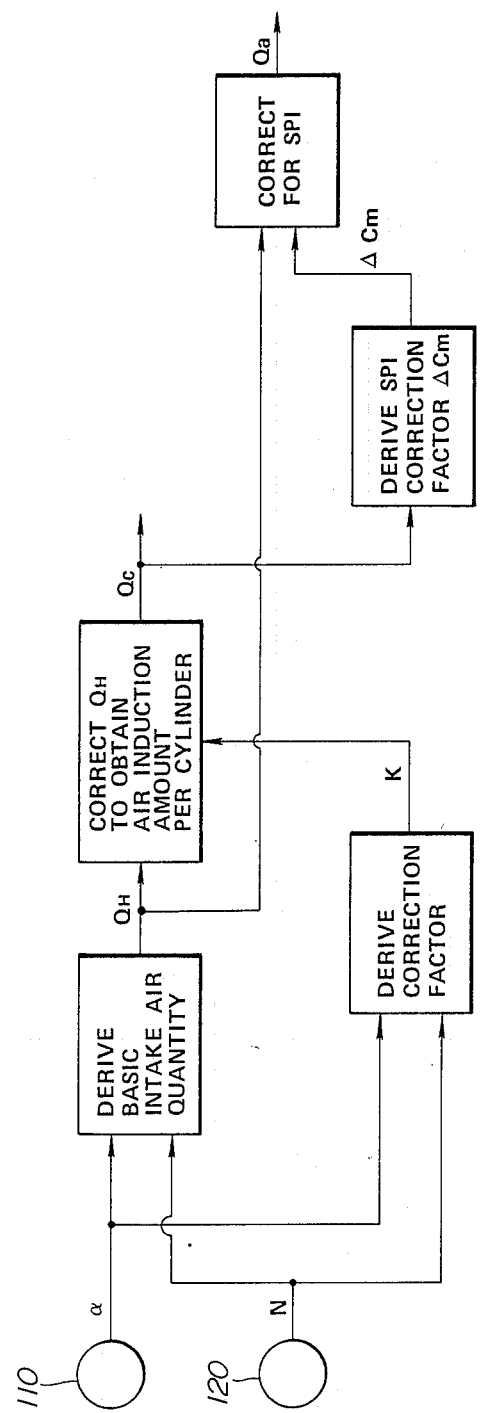
FIG. 21 is a block diagram showing the conceptual arrangement of a fourth embodiment of the present invention.

FIG. 21 shows in schematic form the arrangement which characterizes a fourth embodiment of the present invention. This arrangement is basically a varient of the second embodiment and features the arrangement wherein the values of QH, Qc and Qa are derived thus enabling the same control software to be used in conjunction with either SPI or MPI type injection systems.

However, this embodiment differs in that the value of QH derived in step 1004 of FIG. 3 (for example) is added directly to the Delta Cm value without modification using correction factor K. Viz., the flow chart (not shown) for this calculation is essentially the same as that shown in FIG. 13 with the exception that in step 3002 the value of Qc is replaced with the value QH. The value of Qc is derived using the same technique as shown in FIG. 13. As Delta Cm is derived using Qc the derivation of which involves the use of correction factor K, the effect of this factor is inherently included therein.

Figure 14:
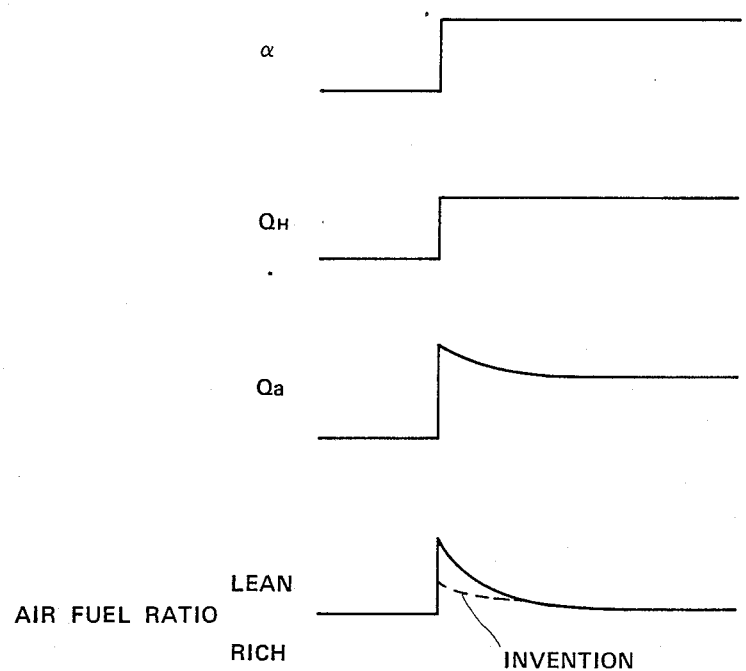
FIG. 14 is a timing chart showing the improvement in air-fuel ratio control which is possible with second embodiment of the present invention.
Figure 22:
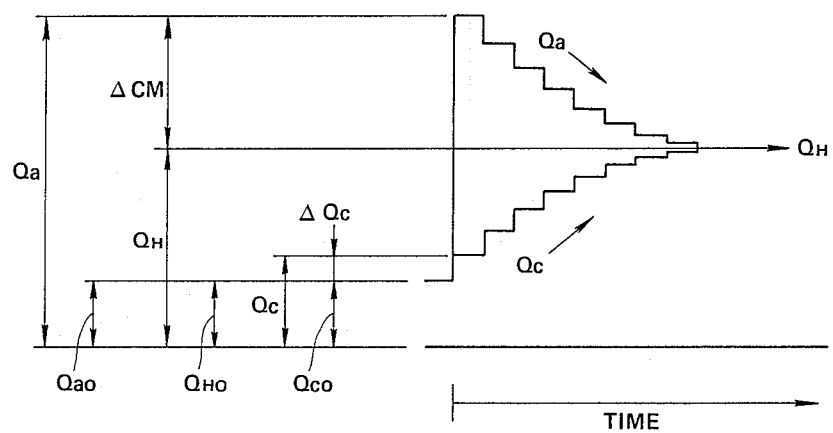
FIG. 22 is a chart showing the effect achieved with the fourth embodiment.

FIG. 22 shows the manner in which the fourth embodiment smoothly modifies the air induction values utilized for SPI (Qa) and MPI (Qc) (c.f. the traces for Qa in FIG. 14 and Qc in FIG. 9, respectively).

What is claimed is:

1. A method of operating an internal combustion engine comprising the steps of:
   sensing a first engine operational parameter which is indicative of engine load;
   sensing a second engine operational parameter which is indicative of the rotational speed of the engine;
   deriving a first variable by comparing the value of said engine load indicative first engine operational parameter with a first set of recorded data, said first set of recorded data being contained in a memory and arranged so that said first variable is recorded in terms of said first parameter;
   modifying the first variable using the value of said second engine operational parameter to derive a second variable; and
   using the value of the second variable and the value of said second engine operational parameter with a second set of recorded data which is contained in said memory and which is recorded in terms of said second variable and said second engine operational parameter, to obtain a third variable indicative of the amount of air being inducted into the engine.

2. A method as claimed in claim 1 further comprising the steps of:
   deriving a first correction coefficient using the values of said first and second operational parameters, and a third set of prerecorded data, said third set of prerecorded data being contained in said memory and arranged so that said first correction coefficient is recorded in terms of said first and second parameters; and
   correcting the third variable using the first correction coefficient to obtain a fourth variable which accurately indicates the amount of air being inducted into said engine.

3. A method as claimed in claim 2, further comprising the step of controlling a first type of engine fuel supply system using the fourth variable.

4. A method as claimed in claim 3, further comprising the steps of:
   calculating a second correction coefficient using the change in said fourth variable per unit time; and
   modifying the instant value of said fourth variable using the second correction coefficient to obtain a fifth variable;
   controlling a second type of engine fuel supply system using said fifth variable.

5. A method as claimed in claim 2, further comprising the steps of:
   limiting the maximum induction vacuum that is permitted to develop in the induction system of the engine by venting air into the induction system;
   obtaining a minimum permissible value for said fourth variable using a fourth set of recorded data, said fourth set of data being stored in said memory and recorded in terms of said second parameter and a minimum induction volume above which said venting will take place;

anticipating the change in actual induction volume induced by said venting by comparing the value of said fourth variable with the minimum permissible value; and using the larger of the two values.

6. A method a claimed in claim 2, further comprising the steps of:

calculating a second correction coefficient using the change in said fourth variable per unit time;

modifying the instant value of said third variable to obtain a fifth variable; and controlling second type of engine fuel supply arrangement using said fifth variable.

7. A method of operating an internal combustion engine comprising the steps of:

sensing the position of a throttle valve which is disposed in an induction passage through which air flow to a combustion chamber of the engine;

sensing the rotational speed of said engine;

deriving the effective cross-sectional area of the induction passage using the throttle valve position and a first set of pre-memorized data which is contained in a memory and is recorded in terms of throttle valve position and effective cross-sectional area; and using the cross-sectional area derived and the rotational speed to derive a basic air induction amount.

8. A method of operating an internal combustion engine comprising the steps of:

sensing the position of a throttle valve which is disposed in an induction passage through which air flows to a combustion chamber of the engine;

sensing the rotational speed of said engine;

deriving the effective cross-sectional area of the inductioin passage using the throttle valve position and a first set of pre-memorized data which is contained in a memory and is recorded in terms of throttle valve position and effective cross-sectional area;

using the cross-sectional area derived and the rotational speed to derive a basic air induction amount;

deriving a correction factor using the cross-sectional area derived, and rotational speed and a second set of pre-memorized data which is contained in said memory and is recorded in terms of said effective cross-sectional area, rotational speed and said correction factor;

modifying the basic air induction amount using the correction factor to derive an accurate estimate of the amount of air which is inducted into said engine.

9. A method as claimed in claim 8, further comprising the step of using said accurate estimate of the amount of air which inducted into said engine to derive the amount of fuel which should be supplied.

10. A method as claimed in claim 9, further comprising the step of using a first type of fuel supply system, said first type of fuel supply system being so constructed and arranged that the fuel is supplied at a location proximate said combustion chamber.

11. A method as claimed in claim 8, further comprising the steps of:

using a passage to bypass the throttle valve when the engine is idling, said bypass passage including a flow control valve therein;

sensing the opening degree of the flow control valve disposed in said bypass passage;

deriving the effective cross-sectional area of the bypass passage using the flow valve position and a third set of pre-memorized data which is recorded in terms of flow control valve position and effective cross-sectional area; and adding the effective cross-sectional area of the bypass passage to the effective cross-sectional area of the induction passage before deriving the basic air induction amount.

12. A method as claimed in claim 8, further comprising the steps of:

supplying fuel to said engine using a second type of supply arrangement wherein the fuel is supplied to the engine at a location which is relatively distal from the combustion chamber;

adding a predetermined amount of air to said accurate estimate, said predetermined amount of air being selected to compensate for the distance between the location at which the fuel is supplied and said combustion chamber.

13. A method as claimed in claim 8, further comprising the steps of:

limiting the maximum vacuum which is permitted to develop in said induction passage downstream of said throttle valve using a vacuum control valve, said vacuum control valve being arranged to open and permit air to enter said induction passage at a location downstream of said throttle valve;

using a forth set of prerecorded data to determine if said vacuum control valve is open, said fourth set of prerecorded data being contained in said memory and recorded in terms of an induction amount above which the vacuum control valve will open and engine speed, said determination being carried out by comparing said accurate estimate with the threshold induction amount for the instant engine speed and determining that the valve is open if said estimate is not greater than said threshold amount; and using the threshold valve to indicate the amount of air being inducted in place of said accurate estimate in the event that said accurate estimate is not greater than said threshold for the instant engine speed.

14. An internal combustion engine comprising:

means for sensing the position of a throttle valve which is disposed in an induction passage through which air flow to a combustion chamber of the engine;

means for sensing the rotational speed of said engine;

means for deriving the effective cross-sectional area of the induction passage using the throttle valve position and a first set of pre-memorized data which is contained in a memory and is recorded in terms of throttle valve position and effective cross-sectional area; and means for using the cross-sectional area derived and the rotational speed to derive a basic air induction amount.

15. An internal combustion engine comprising:

means for sensing the position of a throttle valve which is disposed in an induction passage through which air flow to a combustion chamber of the engine;

means for sensing the rotational speed of said engine;

means for deriving the effective cross-sectional area of the induction passage using the throttle valve position and a first set of pre-memorized data which is contained in a memory and is recorded in terms of throttle valve position and effective cross-sectional area;

means for using the cross-sectional area derived and the rotational speed to derive a basic air induction amount;

means for deriving a correction factor using the cross-sectional area derived, the rotational speed and a second set of pre-memorized data which is contained in said memory and is recorded in terms of the said effective cross-sectional area, rotational speed and said correction factor;

means for modifying the basic air induction amount using the correction factor so as to derive an accurate estimate of the amount of air which is inducted into said engine.

16. An internal combustion engine as claimed in claim 15, further comprising:
means for using said accurate estimate of the amount of air which inducted into said engine to derive the amount of fuel which should be supplied.

17. An internal combustion engine as claimed in claim 16, further comprising:
a first type of fuel supply system, said first type of fuel supply system being so constructed and arranged that the fuel is supplied at a location proximate said combustion chamber.

18. An internal combustion engine as claimed in claim 15, further comprising:
bypass means including a bypass passage which bypasses the throttle valve when the engine is idling, said bypass passage including a flow control valve therein;
means for sensing the opening degree of the flow control valve disposed in said bypass passage;
means for deriving the effective cross-sectional area of the bypass passage using flow valve position and a third set of pre-memorized data which is recorded in terms of flow control valve position and effective cross-sectional area; and
means for adding the effective cross-sectional area of the bypass passage to the effective cross-sectional area of the induction passage before deriving the basic air induction amount.

19. An internal combustion engine as claimed in claim 15, further comprising:
a second type of fuel supply arrangement; the fuel is supplied to the engine at a location which is relatively distal from the combustion chamber; and
means for adding a predetermined amount of air to said accurate estimate, said predetermined amount of air being selected to compensate for the distance between the location at which the fuel is supplied and said combustion chamber.

20. An internal combustion engine as claimed in claim 15, further comprising:
a vacuum control valve for limiting the maximum vacuum which is permitted to develop in said induction passage downstream of said throttle valve, said vacuum control valve being arranged to open and permit air to enter said induction passage at a location downstream of said throttle valve;
means using a fourth set of prerecorded data to determine if said vacuum control valve is open, said fourth set of prerecorded data being contained in said memory and recorded in terms of an induction amount above which the vacuum control valve will open and engine speed, said determination means comparing said accurate estimate with the threshold induction amount for the instant engine speed and determining that the valve is open if said estimate is not greater than aid threshold amount; and
means using the threshold valve to indicate the amount of air being inducted in place of said accurate estimate in the event that said accurate estimate is not greater than said threshold for the instant engine speed.

* * * * *